US009777597B1

(12) United States Patent
Bischof et al.

(10) Patent No.: US 9,777,597 B1
(45) Date of Patent: Oct. 3, 2017

(54) TURBOCHARGER BEARING FLUID FILM SURFACE AND METHOD

(71) Applicant: BorgWarner Inc., Auburn Hills, MI (US)

(72) Inventors: Kenneth R. Bischof, Arden, NC (US); Zachary S. Ashton, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/084,685

(22) Filed: Mar. 30, 2016

(51) Int. Cl.
*F01D 25/16* (2006.01)
*F04D 29/057* (2006.01)
*F16C 17/02* (2006.01)

(52) U.S. Cl.
CPC ......... *F01D 25/166* (2013.01); *F04D 29/057* (2013.01); *F16C 17/026* (2013.01); *F05D 2220/40* (2013.01); *F05D 2230/60* (2013.01); *F05D 2240/50* (2013.01); *F16C 2220/60* (2013.01); *F16C 2360/24* (2013.01)

(58) Field of Classification Search
CPC ................ F16C 17/028; F16C 33/1075; F16C 2360/24; Y10T 82/10; Y10T 82/12; Y10T 82/125; B23Q 17/2233
See application file for complete search history.

(56) References Cited

U.S. PATENT DOCUMENTS

| | | |
|---|---|---|
| 649,302 A | 5/1900 | Hardy |
| 2,249,843 A | 7/1941 | Marsland |
| 2,796,659 A * | 6/1957 | Buske ................. C08K 5/098 29/423 |
| 3,693,297 A | 9/1972 | Cann |
| 4,120,544 A | 10/1978 | Huber |
| 4,671,676 A | 6/1987 | Chen et al. |
| 4,956,945 A | 9/1990 | Ooshima |
| 6,013,016 A | 1/2000 | Irvine et al. |
| 6,626,577 B1 | 9/2003 | Horng et al. |
| 6,852,006 B1 | 2/2005 | Gleason et al. |
| 7,234,871 B2 | 6/2007 | Maruyama et al. |
| 7,264,430 B2 | 9/2007 | Bischof et al. |
| 7,938,582 B2 | 5/2011 | Barlerin et al. |
| 2005/0188798 A1* | 9/2005 | Bischof ................ B23B 5/36 82/1.11 |
| 2006/0078239 A1* | 4/2006 | Dimofte ................ F16C 17/02 384/100 |

(Continued)

FOREIGN PATENT DOCUMENTS

| | | |
|---|---|---|
| DE | 3023317 A1 | 1/1982 |
| JP | 2011208691 A | 10/2011 |
| KR | 101014567 B1 | 2/2011 |

*Primary Examiner* — Phillip A Johnson
(74) *Attorney, Agent, or Firm* — BrooksGroup

(57) ABSTRACT

A bearing system and method may include a bearing element that may have a first surface. A mating element may have a second surface that may face the first surface. A fluid film interface may be defined between the first and the second surfaces. The mating element may rotate about an axis and relative to the bearing element. An axial direction may be defined parallel to the axis. A radial direction may be defined perpendicular to the axis. The first surface may have a profile that may vary in the axial direction and that may varies in the radial direction. The profile may direct a fluid present in the fluid film interface in a direction or directions having circumferential and/or axial components.

1 Claim, 5 Drawing Sheets

(56) References Cited

U.S. PATENT DOCUMENTS

| | | | |
|---|---|---|---|
| 2006/0133904 A1* | 6/2006 | Matsuhashi | B23B 27/06 409/313 |
| 2008/0050184 A1* | 2/2008 | Glaesser | B23C 3/18 407/53 |
| 2009/0099684 A1* | 4/2009 | Roders | B23Q 15/16 700/173 |
| 2012/0288343 A1 | 11/2012 | Symonds | |

* cited by examiner

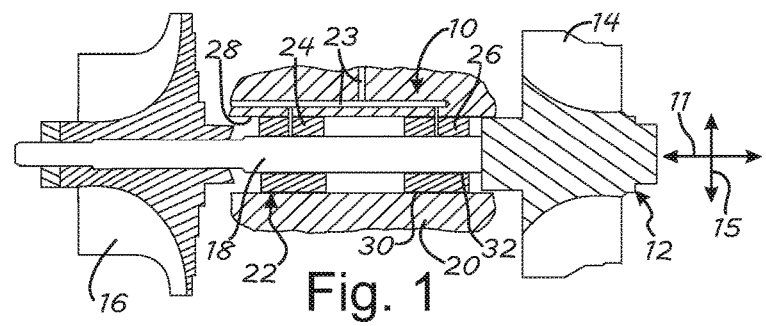
Fig. 1
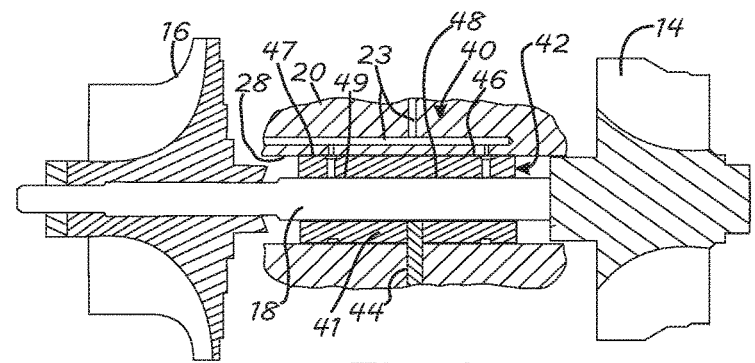
Fig. 2
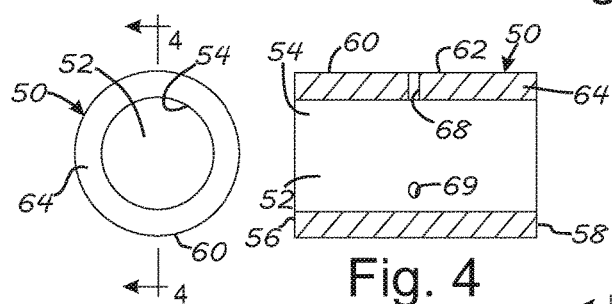
Fig. 3
Fig. 4
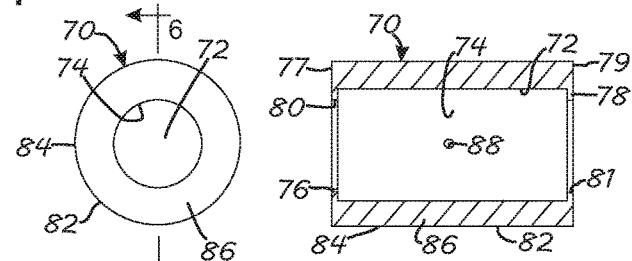
Fig. 5
Fig. 6

TURBOCHARGER BEARING FLUID FILM SURFACE AND METHOD

TECHNICAL FIELD

The field to which the disclosure generally relates includes bearing systems for rotating elements and in particular, includes bearing systems in turbochargers.

BACKGROUND

Bearings typically support rotating elements in a low friction manner, and may be employed in a variety of environments. For example, a turbocharger, such as that used to charge the intake air of an internal combustion engine, may include a compressor driven by a turbine. The turbine may be connected to the compressor by a common shaft that may be supported for rotation by bearings. The shaft and its connected turbine and compressor wheels may rotate at speeds that approach hundreds of thousands of revolutions per minute. In addition, the turbocharger may operate in a high temperature exhaust gas environment.

SUMMARY OF ILLUSTRATIVE VARIATIONS

A number of variations may involve a bearing system that may include a bearing element that may have a first surface. A mating element may have a second surface that may face the first surface. A fluid film interface may be defined between the first and the second surfaces. The mating element may rotate about an axis and relative to the bearing element. An axial direction may be defined parallel to the axis. A radial direction may be defined perpendicular to the axis. The first surface may have a profile that may vary in the axial direction and that may varies in the radial direction. The profile may direct a fluid present in the fluid film interface in both the axial and circumferential directions.

A number of additional variations may involve a method and may include providing a machine with a rotor. Magnetic levitation of the rotor may be provided. The rotor may be provided with a cutting tip. The rotor may be directed through a radial, or may be combined with axial, trajectory using the magnetic levitation. The profile of the bearing element on the inner circumferential surface may be cut with the cutting tip.

Other illustrative variations within the scope of the invention will be apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 is a schematic illustration of a rotating system according to a number of variations.

FIG. 2 is a schematic illustration of a rotating system according to a number of variations.

FIG. 3 is a schematic illustration of part of a bearing system for use with a product according to a number of variations.

FIG. 4 is a schematic cross sectional illustration of part of a bearing system for use with a product according to a number of variations, taken along the line 4-4 indicated in FIG. 3.

FIG. 5 a schematic illustration of part of a bearing system for use with a product according to a number of variations.

FIG. 6 is a schematic cross sectional illustration of part of a bearing system for use with a product according to a number of variations, taken along the line 6-6 indicated in FIG. 5.

DETAILED DESCRIPTION OF ILLUSTRATIVE VARIATIONS

Figure 7:
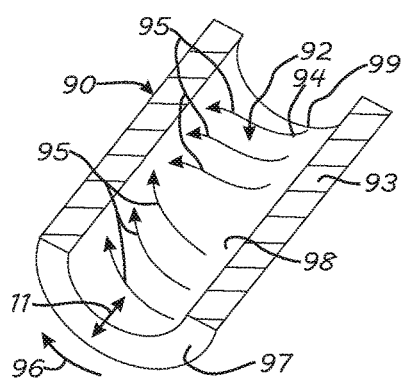
FIG. 7 is a schematic sectioned perspective illustration of part of a bearing system for use with a product according to a number of variations.

The following description of the variations is merely illustrative in nature and is in no way intended to limit the scope of the invention, its application, or uses.

In a number of variations as illustrated in FIG. 1, a product 10 may be used with a rotating system, which for purposes of illustration may be a turbocharger system 12 for use with an engine. The turbocharger system 12 may include a turbine wheel 14 that may exist in a continuous high velocity jet of exhaust gases when the engine is running. The turbocharger system 12 may include a compressor wheel 16 that may be connected to the turbine wheel 14 by a shaft 18 so that the turbine wheel 14 and the compressor wheel 16 rotate together at a variable rotational speed. The shaft 18 may extend through a housing 20. A bearing system 22 may be contained in the housing 20, and the shaft 18 may extend through the bearing system 22. The shaft 18 may be supported by the bearing system 22 to rotate with low friction resistance. The shaft 18 may generally rotate about an axis and the reference line indicates the axial direction 11. The reference line 11 may be intersected by a reference line that may indicate the radial direction 15, which extends ninety degrees relative to the axis and may be directed away from the axis in any of 360 angular degrees around the axis.

In a number of variations a bearing system such as the bearing system 22 may provide efficient, low friction operation with an ability to manage encountered forces in a challenging environment. The bearing system 22 may be a hydrodynamic bearing system supplied with a lubricant through a gallery system 23 to inhibit contact, provide damping, and/or to control motion. The bearing system 22 may use fully floating journal type bearings 24 and 26 and the shaft 18 may be a mating element relative to the bearings 24 and 26. The bearings 24 and 26 may be contained in a bore 28 of the housing 20 and may be provided with a retention mechanism to maintain their axial position, such as clip rings (not shown), or other devices known in the art. The bearing 24 and 26 may encircle the shaft 18 and may freely float within their retention system, which may include rotation with the shaft 18 and within the housing 20. The bearing 24 and 26 may generally rotate at a slower speed than the shaft 18 so that relative rotation occurs at their mating interfaces. As a result, with the bearings 24 and 26 there may be two hydrodynamic oil film interfaces, which may include an outer film interface 30 between the housing 20 and the bearings 24, 26, and an inner film interface 32 between the bearings 24, 26 and the shaft 18.

In a number of other variations a product 40 as shown in FIG. 2, may include the turbine wheel 14 and the compressor wheel 16 connected by the shaft 18. The shaft 18 may be supported in the housing 20 by a bearing system 42. The bearing system 42 may be a semi-floating bearing system. A pin 44, or other anti-rotation devices as known in the art, may engage the housing 20 and the bearing system 42. The bearing system 42 may float between the shaft 18 and the housing 20 but may be restrained from rotating relative to the housing 20 by the pin 44. The shaft 18 may rotate relative to the bearing system 42 and the housing 20. The semi-floating bearing system 42, in this case, may be an example of a single, integral or assembled unit comprising two separate semi-floating bearing ends, adjoined by a center connecting section 41. One semi-floating end is made up of inner film interface 49 and outer film interface 47, and the other semi-floating end made up of an inner film interface 48 and an outer film interface 46. In other variations each semi-floating bearing end floats separately without adjoining center section 41, with each having a separate anti-rotation device. The bearing system 42 may have four or more oil film interfaces, which may include two or more outer film interfaces 46, 47 between the housing 20 and the bearing system 42, and two or more inner film interfaces 48, 49 between the bearing system 42 and the shaft 18. The inner film interfaces 48, 49 may be a hydrodynamic oil film interface. The outer film interfaces 46, 47 may operate as a squeeze film interface for damping between the bearing system 42 and the housing 20. In a number of variations the products 10, 40 may include a thrust bearing system (not shown), as known in the art, which may, or may not, be integral to the radial bearing systems.

With reference to FIGS. 3 and 4, in a number of variations a bearing 50 is illustrated, which may be used in the bearing system 22 or the bearing system 42 for the inner film interfaces 48, 49. The bearing 50 may be of a generally hollow cylindrical shape. The bearing 50 may have an axially extending opening 52 that may define an inner circumferential surface 54 of each film interface 48, 49, and each may be a variation of the other. The inner circumferential surface 54 may extend around the 360 degree circumference of the opening 52 from a first end 56 to a second end 58 of the bearing 50. The bearing 50 may have an outermost perimeter 60 that extends around the bearing 50 and that defines an outer circumferential surface 62. The outer circumferential surface 62 may extend from the end 56 to the end 58 and may have circumferential oil grooves (shown in FIG. 2). The bearing 50 may have a wall 64 that may exist between the inner circumferential surface 54 and the outer circumferential surface 62. A number of openings 68, 69 may extend in the radial direction 15 through the wall 64 from the outer circumferential surface 62 to the inner circumferential surface 54. The openings 68, 69 may cooperate with the gallery system 23 to supply lubricant to the inner circumferential surface 54 and the interfacing shaft 18.

With reference to FIGS. 5 and 6, in a number of variations a bearing 70 is illustrated, which may be used in the bearing system 22 or the bearing system 42. The bearing 70 may be of a generally hollow cylindrical shape. The bearing 70 may have an axially extending opening 72 that may define an inner circumferential surface 74. A first dam 76 may be formed at an end 77 of the bearing 70. A second dam 78 may be formed at an opposite end 79 of the bearing 70 from the end 77. The dams 76 and 78 may have axial openings 80 and 81 respectively, that may be circular in shape and that may have an open diameter that is smaller than the open diameter of the opening 72, and the difference may be exaggerated in FIG. 6 for visible clarity. The inner circumferential surface 74 may extend around the 360 degree circumference of the opening 72 and may extend axially from the first dam 76 to the second dam 78. Each dam 76, 78 may have surface variations to each other, and may also have profiled surfaces. As a result, the axial extending opening 72 may not extend all the way to the ends 77, 79 of the bearing 70. The bearing 70 may have an outermost perimeter 82 that extends around the bearing 70 and that defines an outer circumferential surface 84. The outer circumferential surface 84 may extend from the end 77 to the end 79 and may have circumferential oil grooves (shown in FIG. 2). The bearing 50 may have a wall 86 that may exist between the inner circumferential surface 74 and the outer circumferential surface 84. A number of openings 88 may extend in the radial direction 15 through the wall 86 from the outer circumferential surface 84 to the inner circumferential surface 74. The opening or openings 88 may cooperate with the gallery system 23 to supply lubricant to the inner circumferential surface 74 and the interfacing shaft 18. The dams 76, 78 may assist in maintaining the lubricant at the oil film interface at the inner circumferential surface 74, and regulating oil flow out the ends 77, 79.

With reference to FIG. 7, a fragmented half of a bearing 90 is shown for visibility of the inner circumferential surface 92. The bearing 90 may represent the bearing 50 and/or the bearing 70. The bearing 90 may be a fully floating bearing or a semi-floating bearing or another type with an inner hydrodynamic oil film interface at the inner circumferential surface 92. The inner circumferential surface 92 of the wall 93 may have a profile 94 shaped to provide directed convergence 95 of the lubricant at the interface between the bearing 90 and the shaft 18, and may be formed without steps that may have distinct edges. Convergence may indicate a movement and accumulation of the lubricant from one or more areas of the inner circumferential surface 92 to one or more other areas of the inner circumferential surface 92 at the interface with the shaft 18. Directed convergence may include convergence with flow components in one or more directions which may include the axial direction 11 and a circumferential direction 96. The circumferential direction 96 may be a direction following the circumference of the inner circumferential surface 92 around the axis of the bearing 90 and the shaft 18. In the present example, the directed convergence may have components in the circumferential direction 96 and in the axial direction 11 toward a midpoint 98 along the axial length of the bearing 90 and away from each of the ends 97, 99 of the bearing 90. The profile 94 of the inner circumferential surface 92 may be shaped to effect the directed convergence.

Figure 8:
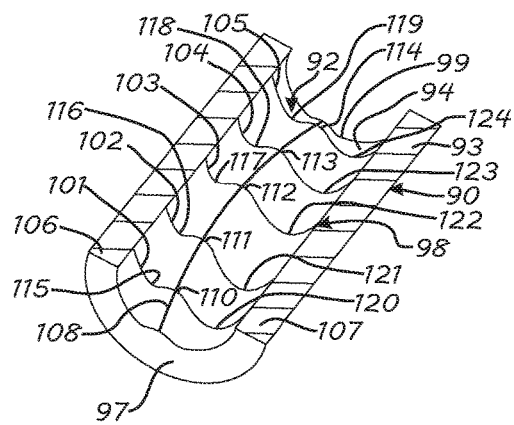
FIG. 8 is a schematic sectioned perspective illustration of part of a bearing system for use with a product according to a number of variations.

With reference to FIG. 8, in a number of variations the profile 94 of the of the inner circumferential surface 92 may be demonstrated by a number of discrete reference lines 101, 102, 103, 104 and 105 selected along the axial length of the bearing 90. The reference lines 101-105 are shown extending along 180 degrees of the inner circumferential surface from zero degrees at the section edge 106 to 180 degrees at the section edge 108. It should be understood that the inner circumferential surface extends 360 degrees around the axis for a complete non-sectioned bearing 90. The profile 94 at each of the reference lines 101-105 may have a varying height created by a varying thickness of the wall 93. The profile 94 may have a peak 109 running in a ridge through points 110, 111, 112, 113 and 114 and alternating valleys, one running through points 115, 116, 117, 118, 119 and another running through points 120, 121, 122, 123, 124. For example, the reference line 101 may follow the profile 94 through a valley which may be the lowest at point 120, over the peak 108 at point 110 and through another valley at point 115. The peak points 110-114 and valley points 115-119 and 120-124, may be shown exaggerated for visual clarity of their difference in height. In a number of variations the difference in heights between the peak points 110-114 and the valley points 115-119 may be in the normal range of 4-30 microns. The alternating peaks and valleys around the circumference of the inside of the bearing 90 may affect the circumferential convergence of the oil film in the interface between the bearing 90 and the shaft 18. The lubricant may be directed in an up-hill fashion, for example from the valley 120 up toward the peak 110 for convergence at the relatively high locations forming a number of wedges of lubrication around the perimeter to the shaft 18 which may reduce vibration, noise, may increase stability and enable higher rotational speeds. In addition, the peak points 110-114 along the length of the bearing 90 may be located at varying angular distances from the edge 106. For example, the point 110 may be located a distance of ninety degrees from the edge 106. The point 111 may be located at a distance of seventy-eight degrees from the edge, and the point 112 may located at a distance of sixty-six degrees from the edge 106 and may be at the midpoint 98 along the axial length of the bearing 90. The peak may transition back to seventy-eight degrees at the point 113 and to ninety degrees at the point 114. As a result, the ridge defined by the peak 108 may shift forward in rotation of the shaft 18 moving from the ends 97 and 99 toward the midpoint 98. As a result, the lubricant may be directed in an inward direction away from the ends 97 and 99 fashion, having a convergence component in an axial direction toward the midpoint 98. This may assist in maintaining the lubricant from leaking out the ends 97, 99 and in the interface between the bearing 90 and the shaft 18. As a result the bearing 90 may provide directed convergence in both the circumferential direction and the axial direction.

Figure 9:
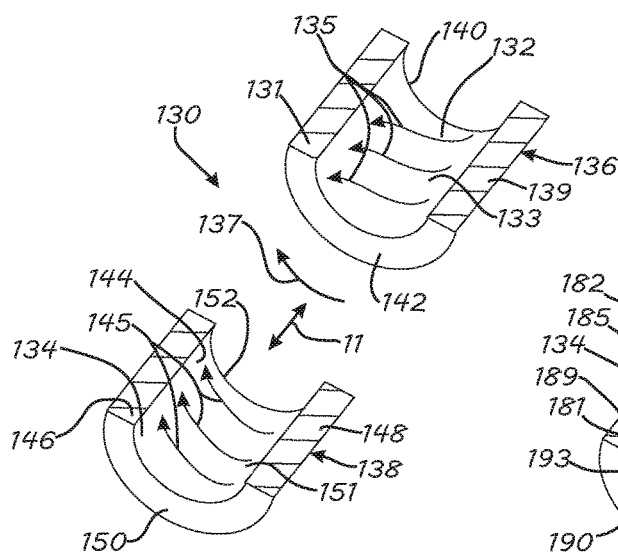
FIG. 9 is a schematic sectioned perspective illustration of part of a bearing system for use with a product according to a number of variations.

In a number of variations as illustrated in FIG. 9, a bearing set 130 is shown as a fragmented half section for visibility of the the inner circumferential surfaces 132 and 134 of the bearings 136 and 138. The bearings 136 and 138 may be disposed in spaced apart locations on the shaft 18 and in the housing 20. The bearings 136 and/or 138 may represent the bearing 50 and/or the bearing 70. The bearings 136, 138 may be fully floating bearings or a semi-floating bearings or another type with an inner hydrodynamic oil film interface at the inner circumferential surfaces 132, 134. The inner circumferential surface 132 of the bearing 136 may have a profile 133 shaped to provide directed convergence 135 of the lubricant at the interface between the bearing 136 and the shaft 18. The directed convergence 135 may include convergence components in multiple directions which may include the axial direction 11 and a circumferential direction 137. In the present example, the directed convergence may have a component in the circumferential direction 137 from the edge 139 to the edge 131. The directed convergence may also have a component in the axial direction 11 along the axial length of the bearing 136 away from the end 140 and toward the end 142. The profile 133 of the inner circumferential surface 132 may be shaped to effect the directed convergence. The inner circumferential surface 134 of the bearing 138 may have a profile 144 shaped to provide directed convergence 145 of the lubricant at the interface between the bearing 138 and the shaft 18. The directed convergence 145 may include convergence components in two directions which may include the axial direction 11 and a circumferential direction 137. In the present example, the directed convergence may be directed in the circumferential direction 137 from the edge 148 toward the edge 146. The directed convergence may be directed in the axial direction 11 along the axial length of the bearing 138 away from the end 150 and toward the end 152. The profile 151 of the inner circumferential surface 134 may be shaped to effect the directed convergence.

Figure 10:
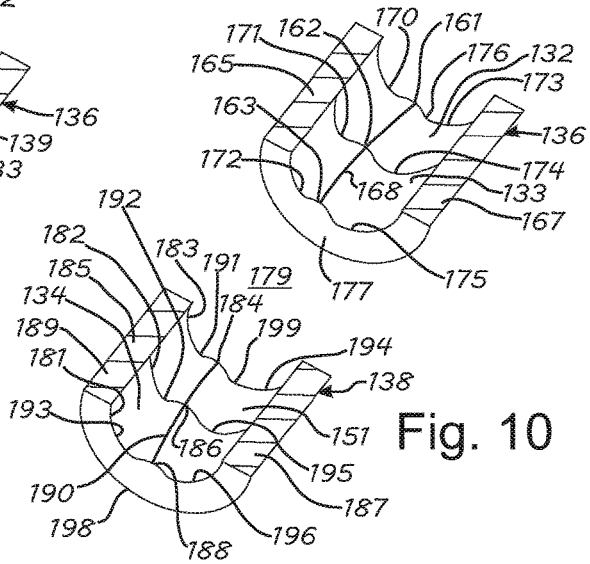
FIG. 10 is a schematic sectioned perspective illustration of part of a bearing system for use with a product according to a number of variations.

With reference to FIG. 10, in a number of variations the profile 133 of the of the inner circumferential surface 132 may be demonstrated by a number of discrete reference lines 161, 162 and 163 selected along the axial length of the bearing 136. The reference lines 161-163 are shown extending along 180 degrees of the inner circumferential surface 132 from zero degrees at the section edge 165 to 180 degrees at the section edge 167. It should be understood that the inner circumferential surface extends 360 degrees around the axis for a complete non-sectioned bearing 130. The profile 133 at each of the reference lines 161-163 may have a varying height created by a varying thickness of the wall 139. The profile 133 may have a peak 168 running in a ridge through points 161, 162 and 163 and alternating valleys, one valley running through points 170, 171, 172 and another valley running through points 173, 174 and 175. For example, the reference line 161 may follow the profile 133 through a valley which may be the lowest at point 173, over the peak 168 at point 161 and through another valley at point 170. The peak points 161-163 and valley points 170-172 and 173-175, may be shown exaggerated for visual clarity of their difference in height. The alternating peaks and valleys around the circumference of the inside of the bearing 130 may affect the circumferential convergence of the oil film in the interface between the bearing 130 and the shaft 18. The lubricant may be directed in an up-hill fashion, for example from the valley 173 up toward the peak 161 for convergence at the relatively high locations. In addition, the peak points 161-163 along the length of the bearing 130 may be located at varying angular distances from the edge 165. For example, the point 161 may be located a distance of eighty degrees from the edge 165. The point 162 may be located at a distance of seventy-eight degrees from the edge, and the point 163 may be located at a distance of sixty-six degrees from the edge 165. The peak ridge may be transition closer to the edge 165 moving from the end 176 to the end 177. As a result, the ridge defined by the peak 168 may shift forward in rotation of the shaft 18 moving from the ends 176 to end 177. As a result, the lubricant may be directed in an inward direction away from the end 176, for convergence with an axial component in the direction toward the end 177 which may be disposed to lead to an area 179 between the bearings 136 and 138. This may assist in maintaining the lubricant from leaking out the outboard end 176 relative to the housing 20 which may be toward the turbine wheel 14. As a result the bearing 130 may provide directed convergence with components in both the circumferential direction and the axial direction.

In a number of variations in the bearing 138, the profile 151 of the of the inner circumferential surface 133 may be demonstrated by a number of discrete reference lines 181, 182 and 183 selected along the axial length of the bearing 138. The reference lines 181-183 are shown extending along 180 degrees of the inner circumferential surface 134 from zero degrees at the section edge 185 to 180 degrees at the section edge 187. It should be understood that the inner circumferential surface 134 extends 360 degrees around the axis for a complete non-sectioned bearing 138. The profile 151 at each of the reference lines 181-183 may have a varying height created by a varying thickness of the wall 189. The profile 151 may have a peak 190 running in a ridge through points 184, 186 and 188 and alternating valleys, one valley running through points 191, 192, 193 and another valley running through points 194, 195, 196. For example, the reference line 183 may follow the profile 151 through a valley which may be the lowest at point 199, over the peak 190 at point 184 and through another valley at point 191. The peak points 184, 186, 188 and valley points 191-193 and 194-196, may be shown exaggerated for visual clarity of their difference in height. The alternating peaks and valleys around the circumference of the inside of the bearing 138 may affect the circumferential convergence of the oil film in the interface between the bearing 138 and the shaft 18. The lubricant may be directed in an up-hill fashion, for example from the valley 194-196 up toward the peak 190 for convergence at the relatively high locations. In addition, the peak points 184, 186, 188 along the length of the bearing 138 may be located at varying angular distances from the edge 185. For example, the point 188 may be located a distance of eighty degrees from the edge 185. The point 186 may be located at a distance of seventy-eight degrees from the edge 185, and the point 184 may be located at a distance of sixty-six degrees from the edge 185. The peak ridge may transition closer to the edge 185 moving from the end 198 to the end 199. As a result, the ridge defined by the peak 190 may shift forward in rotation of the shaft 18 moving from the end 198 to end 199. As a result, the lubricant may be directed in an inward direction away from the end 198, for convergence in an axial direction toward the end 199 which may be disposed to lead to an area 179 between the bearings 136 and 138. This may assist in maintaining the lubricant from leaking out the outboard end 198 relative to the housing 20 which may be toward the compressor wheel 16. As a result the bearing 138 may provide directed convergence with components in both the circumferential direction and the axial direction. The bearings 136 and 138 may be used in a pair with the axial convergence component directed to an area 179 inside the housing 20.

Figure 11:
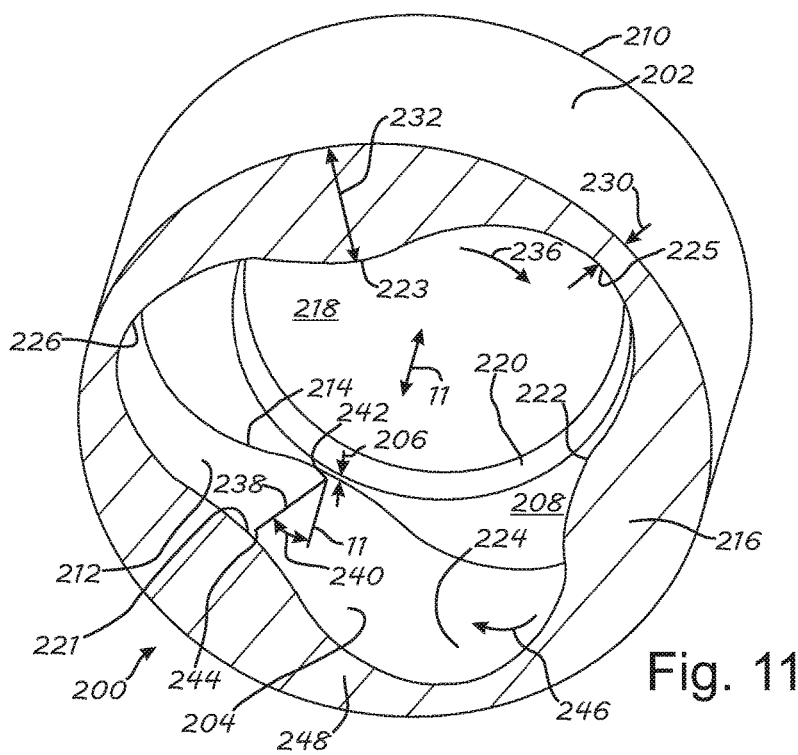
FIG. 11 is a schematic sectioned perspective illustration of part of a bearing system for use with a product according to a number of variations.

In a number of variations as illustrated in FIG. 11 a bearing 200 is shown sectioned with part of its length removed. The bearing 200 may be used in the bearing assembly 22 or 42. The bearing 200 may have an outer circumferential surface 202 which may face the housing 20 in the bore 28. The bearing 200 may have an inner circumferential surface 204, which may face the shaft 18. A hydrodynamic oil film interface may be defined between the inner circumferential surface 204 and the shaft 18. The inner circumferential surface may extend in the axial direction 11 from a dam 208 at the end 210 to another dam at the sectioned away other end of the bearing 200. The profile 212 of the inner circumferential surface 204 visible at the junction 214 with the dam 208, may be a smooth transition rather than a discernable edge. The profile 212 may be defined by a varying thickness of the wall 216 of the bearing 200. The dam 208 may define an opening 218 inside a circular wall edge 220 that may face inward toward the axis 11. The edge 220 may be a minimum distance 206 away from the profile 212 to inhibit oil movement outward past the dam 208. The opening 218 may have a circular profile around its circumference. Weep holes and axial oil feed/drain grooves, which are omitted in the illustrations, may be included. The profile 212 may undulate around the circumference of the inner circumferential surface 204 between alternating peaks 221, 222 and 223, and valleys 224, 225 and 226. The number of peaks and valleys may vary depending on the rotational speed of the application and the size of the bearing. The variation of the thickness of the wall 216 is exaggerated for the purposes of providing visual clarity. The wall thickness 230 at the lowest point of the valley 225 may be in the normal range of 4-30 microns less than the wall thickness 232 at the highest point of the peak 223. The profile 212 may include smooth ramp like structures from the valleys to the peaks, such as from valley 226 to peak 221.

In a number of variations the profile 212 of the ridges created by the peaks, such as peak 221 moves clockwise (as viewed in FIG. 11), moving inward from the end 210. More specifically, the shaft 18 may rotate in the rotation direction 236. The top of the ridge defined by the peak 221 may be represented by the curve 238. Moving inward from the dam 208, the curve 238 moves clockwise away from the axial direction 11, and at an acute angle 240 relative to the axial direction 11. As a result, the point 242 will reach an axially directed line along the outer diameter of the shaft 18 prior to the point 244. As a result, oil film may have a circumferential component for convergence uphill, such as from the valley 224 toward the peak 238 in the circumferential direction 246, and oil film may also have an axial component for convergence in an axially inward direction from the dam 208 toward the section's broken edge 248, providing directed convergence.

Figure 12:
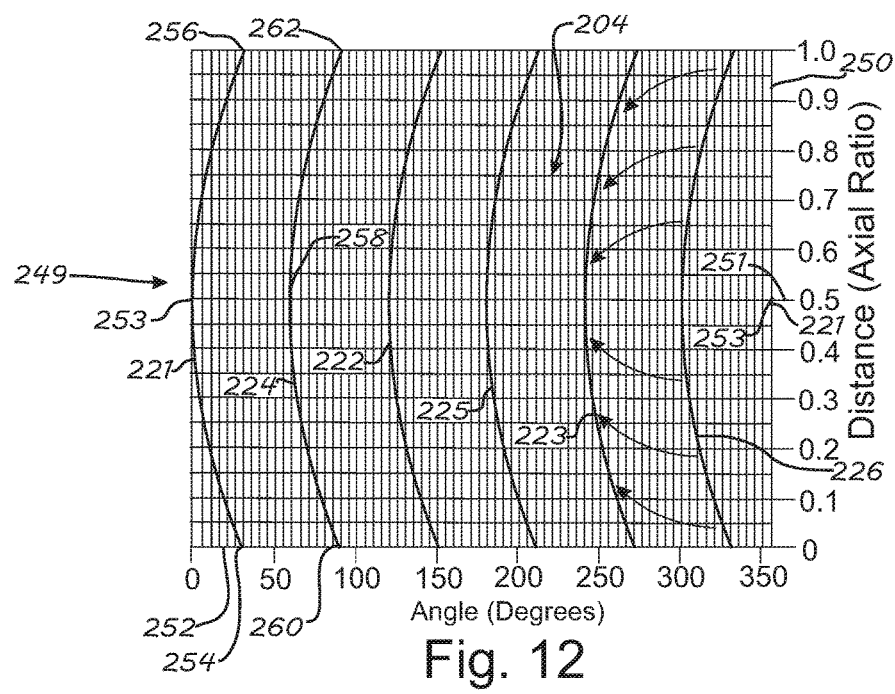
FIG. 12 is a two dimensional diagram of a bearing inner profile according to a number of variations with location angles on the horizontal axis versus axial location ratio on the vertical axis.

In a number of variations as illustrated in FIG. 12, the profile 212 of the bearing 200 may be illustrated in the form of a chart 249, with the understanding that the complete bearing is represented include the part removed from the sectioned view of FIG. 11. The inner circumferential surface 204 is shown in two-dimensional form in the flat chart 249. The chart may be described as a map of the inner circumferential surface 204. The vertical axis 250 represents a non-dimensionalized ratio of the axial location along the inner circumferential surface 204 in the axial direction 11 from one of its ends to another, with zero being at one end and 1.0 being at the other end. So, the axial ratio represents the distance along the length of the bearing in the axial direction as a ratio to the total length of the bearing. The actual bearing length, or distance from ratio zero to ratio 1.0 may be in the neighborhood of a bearing length of L in the current variation. The bearing length L may be determined using the L/D ratio, where L is bearing length and D is bearing inner diameter, and the ratio L/D=0.2 to 1.5. However, the length may vary depending on the application. The horizontal axis 252 represents location around the circumference of the inner circumferential surface 204 from zero to three hundred and sixty degrees. For example, the chart 249 illustrates the C-shaped arc-like ridge and trough character of the peaks 221-223, and the valleys 224-226, respectively. The chart 249 shows zero/three hundred and sixty at the top of the peak 221 at the midpoint line 251 of the bearing 200 at ratio 0.5 on the axis 250 and angle zero/three hundred and sixty on the axis 252, designated by reference number 253. As demonstrated, when moving away from the midpoint line 251, the peak 221 moves to the right in the chart 249 to approximately twenty-four degrees around the inner circumferential surface 204 at points 254 and 256, at zero and 1.0 location ratio respectively, on the bearing 200. Similarly, the chart 249 shows the valley 224, wherein along the midpoint line 251, the lowest point 258 of the valley 224 may be located at approximately sixty degrees along the inner circumferential surface 204 along axis 252. Along the zero line of the axis 250, and along the 1.0 ratio line of the axis 250, the lowest point of the valley 224 may be located at approximately eighty-five degrees along the inner circumferential surface 204 at points 260 and 262, respectively. In this manner the height (distance from the outer circumferential surface 202), of the inner circumferential surface 204 may vary in the circumferential direction along the axis 252 and along the axial direction along the axis 250. As a result, directed convergence of the oil film in the interface between the shaft 18 and the bearing 200 may be provided as shown by the arrows between valley 226 and peak 223. In a number of variations a similar profile with single or directed convergence may be provided at the outer circumferential surface 202 or on the surface of the housing in the bore. The outer circumference of the shaft 18 may be formed substantially circular, or with a small eccentricity or a small deviation from circular, in each case in the range of a few microns.

Figure 13:
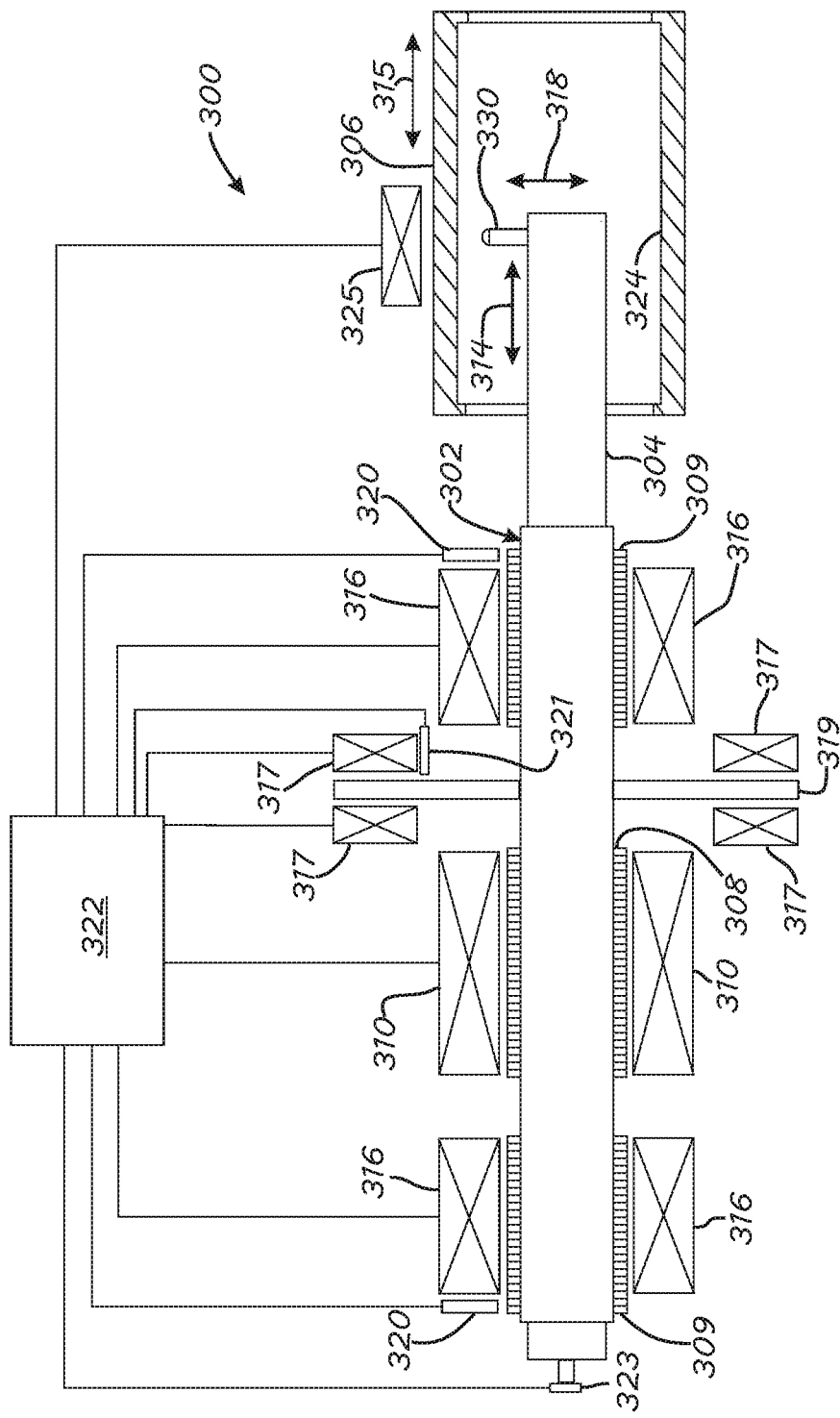
FIG. 13 is a schematic diagram of a method of making a product according to a number of variations.

With reference to FIG. 13, in a number of variations a method of making a bearing such as the bearings 24, 26, 50, 70, 90, 130, 200, may involve a machine 300 that may be a high-speed magnetically levitated machine tool and spindle assembly. The machine 300 may include a rotor 302 which may include a boring bar 304 for interacting with a workpiece 306, which may be a bearing. The rotor 302 may include a section 308 with motor laminations and rotor bars. The rotor 302 may include sections 309 with magnetic bearing laminations. The rotor 302 may be surrounded by motor windings 310 that may interact with the section 308 to effect rotation of the rotor 302. The rotor 302 may be surrounded by axial bearing windings 317 that may interact with the rotor thrust disc 319 to support the rotor 302 along the axial direction 314 and also may direct the axial trajectory 314 of the boring bar 304. The rotor 302 may be surrounded by radial bearing windings 316 that may interact with the sections 309 to support the rotor 302 and to direct the radial trajectory 318 of the spindle 304. A sensor 320, which may be multiple sensors, may monitor and report the radial position of the rotor 302 and sensor 321, which may be multiple sensors, may monitor and report the axial position of the rotor 302 in the axial direction. A sensor 323 may monitor angular position of the rotor 302. An electronic controller system 322, for example may include components like a motor drive, magnetic bearing amplifiers and control components may control power to each of the motor windings 310, the axial bearing windings 317, the radial bearing windings 316 and the linear slide 325. Tracking of the rotor 302 may be controlled by monitoring and recording data from sensors 320, 321 and 323, and controlling the operation of the axial bearing windings 312, the radial bearing windings 316 and the linear slide 325, to direct the axial and radial trajectories 314, 318 relative to the bearing 306. In other variations some or all of the functions of the motor windings 310, the axial bearing windings 317 and the radial bearing windings 316 may be combined into a fewer number of windings or may be provided in coordination with a greater number of windings. A linear slide 325 may be controlled by the controller components 322 to coordinate motion 315 of the workpiece 306 with the radial 318 and axial 314 trajectory of the rotor 302.

In operation of the electronic controller components 322, methods, algorithms, or parts thereof may be implemented in a computer program(s) product including instructions or calculations carried on a computer readable medium for use by one or more processors to implement one or more of the method steps or instructions. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program may be executed on one processor or on multiple processors in communication with one another.

In a number of variations, the program(s) may be embodied on computer readable media, which can include one or more storage devices, articles of manufacture, or the like. Illustrative computer readable media may include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium also may include computer to computer connections, for example, when data may be transferred or provided over a network or another communications connection (either wired, wireless, or a combination thereof). Any combination(s) of the above examples is also included within the scope of the computer-readable media. It is therefore to be understood that methods may be at least partially performed by any electronic articles and/or devices capable of executing instructions corresponding to one or more steps of the disclosed methods. The electronic controller 322 may implement programs to move the spindle 302, boring bar 304 and axial slide 325, through a range of radial, and may be combined with axial, trajectories combined to cut a desired surface on the inner circumferential surface 324 of the workpiece 306. The electronic controller 322 may be programmed with the data to control cutting such as to effect the profile charted in FIG. 12 by dimensionally varying the radial and axial trajectories 318, 314 of the spindle 304.

Figure 14:
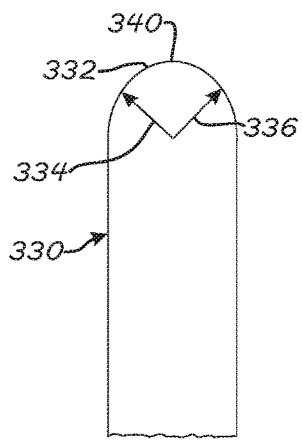
FIG. 14 is a schematic illustration of a cutting tip according to a number of variations.
Figure 15:
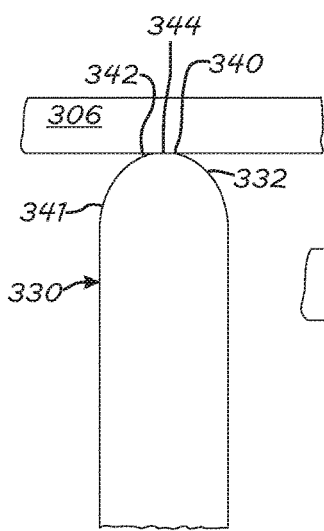
FIG. 15 is a schematic illustration of a step in a method of making a product according to a number of variations.
Figure 16:
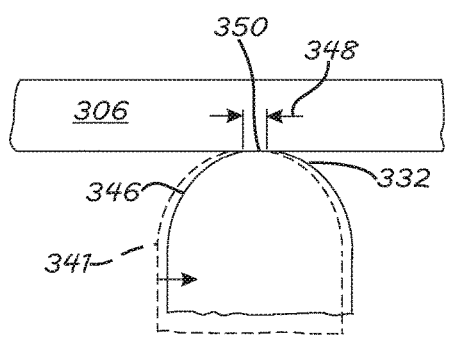
FIG. 16 is a schematic illustration of a step in a method of making a product according to a number of variations.
Figure 17:
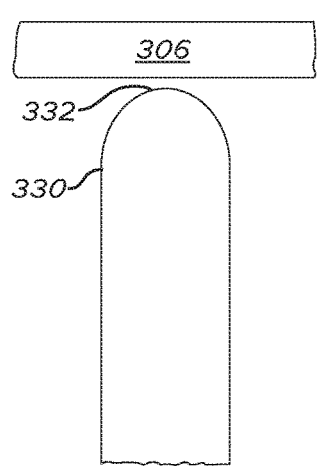
FIG. 17 is a schematic illustration of a step in a method of making a product according to a number of variations.
Figure 18:
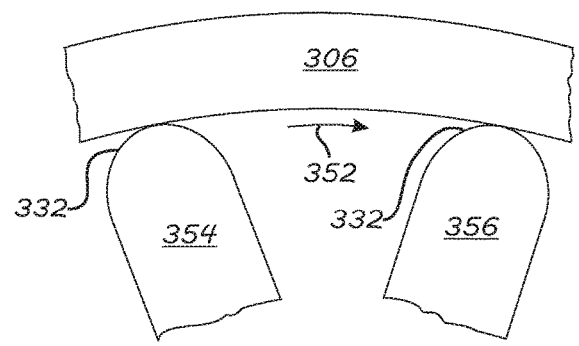
FIG. 18 is a schematic illustration of a step in a method of making a product according to a number of variations.

In a number of variations the boring bar 304 may include a cutting tool 330. With reference to FIG. 14, the cutting tool 330 may include a tip 332. The tip 332 may include a radius 334 which may be in the range of 0.1-1.0 millimeters. The tip 332 may include a radius 336 that may be in the range of 0.1-3.0 millimeters. The radius 334 may join with the radius 336 at the terminal point 340 of the tip 332. In other variations a flat or angled surface may be interposed between the radius 334 and the radius 336 at the terminal point 340. With reference to FIG. 15, the cutting tool 330 may be illustrated contacting the workpiece 306 in a cutting operation with the tip 332 rotating around an axis 342 so that the tip 332 may be described as travelling into the view of FIG. 15. The tip 332 may make a cutting pass around the axis 342 at a location 342 with the terminal end 340 contacting the workpiece 306 at a cutting area 344, which cuts along a circumferential and axial length of the workpiece 306. With reference to FIG. 16, the tip 332 may make a subsequent cutting pass at location 346 with the terminal end 340 contacting the workpiece 306 at an area 350. The area 350 may overlap 348 with the area 342 to provide the desired profile as the cutting tool 330 advances along the workpiece 306. With reference to FIG. 17, as the tip 332 is making a cutting pass such as at position 342 or 346, the terminal end 340 may be separated from the workpiece 306 in an intermittent fashion so as to provide a milling type cut. A milling type cut may be advantageous for heat management and chip formation, and to add scallop features after profiles 212 are formed. In a number of other variations the terminal end 340 may remain in contact with the workpiece 306 during cutting, which may provide a boring type cutting action. In a number of other variations the cutting tool 330 may be guided to provide a combination of milling-type and boring-type cutting actions at various positions on the workpiece 306 through control of the axial and radial trajectories 314, 318. In a number of other variations as illustrated in FIG. 18, the cutting tool 330 is illustrated from an end of the workpiece 306 with cutting action being directed in a clockwise direction 352. The tip 332 may be directed through the axial and radial trajectories 314, 318 to contact the workpiece 306 at a leading angle at 354 or at a trailing angle at 356. The angle 354 or 356 may be selected rather than a perpendicular orientation relative to the workpiece 306 to optimize cutting performance. The angle 354 or 356 may allow the cutting tool 330 and rotor 302 to follow its preferred orientation based on its response motion due to dynamic and static forces on the rotor 302. In a number of variations the desired profile may be achieved with transition discontinuity, such as from a peak to a valley, controlled by coordinating the radial and axial trajectories 318, 314. Control of the cutting tip 332 through tracking control of the windings 316 and 317 during their operation as actuators to manipulate the rotor 302. In a number of variations the workpiece 306 may be fed by linear slide 325 toward the rotor 302 in combination with radial and axial control of the rotor 302.

Through the foregoing variations a bearing, and a method of making a bearing with directed convergence is provided. The description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may involve a bearing system that may include a bearing element that may have a first surface. A mating element may have a second surface that may face the first surface. A fluid film interface may be defined between the first and the second surfaces. The mating element may rotate about an axis and relative to the bearing element. An axial direction may be defined parallel to the axis. A circumferential direction may be defined encircling around to the axis. The first surface may have a profile that may vary in the axial direction and that may varies in the radial direction. The profile may direct a fluid present in the fluid film interface in both the axial and circumferential directions.

Variation 2 may include the bearing system according to variation 1 wherein the profile may have a shape that is smooth without edged steps, not including any other feature that may intersect the profile for example, but not limited to, features such as oil inlet holes and/or oil feed grooves.

Variation 3 may include the bearing system according to variation 1 or 2 wherein the first surface may be an inner circumferential surface of the bearing. The profile may include a number of valleys that may define troughs along the first surface, and may include a number of peaks that may define ridges along the first surface. The troughs and ridges may alternate around the inner circumferential surface.

Variation 4 may include the bearing system according to variation 3 wherein the bearing element may include a first end and may include an opposite second end spaced from the first end in the axial direction. Each of the troughs and valleys may extend from the first end to the second end.

Variation 5 may include the bearing system according to variation 3 wherein the bearing element may include a first end and may include an opposite second end spaced from the first end in the axial direction. A first dam may be defined at the first end and a second dam may be defined at the second end. Each of the first and second dams may extend inward in the radial direction further than the inner circumferential surface. Each of the troughs and valleys may extend from the first dam to the second dam.

Variation 6 may include the bearing system according to variation 3 wherein each of the troughs and valleys may extend from a first end to a second end. The bearing may be shaped as a hollow cylinder and may define an open area inside the hollow cylinder. The inner circumferential surface may face into the open area. The inner circumferential surface may extend three hundred and sixty degrees around the open area. Each of the ridges at a defined axial location such as the midpoint of the bearing along the axis may be offset around the inner circumferential surface from all points on the respective ridge that may be located outward toward the first or second end from the midpoint.

Variation 7 may include the bearing system according to variation 3 wherein each of the troughs and valleys may extend from a first end to a second end. The bearing may be shaped as a hollow cylinder and may define an open area inside the hollow cylinder. The inner circumferential surface may face into the open area. The inner circumferential surface may extend three hundred and sixty degrees around the open area. Each of the ridges at its first end may be offset around the inner circumferential surface from all points on the respective ridge that may be located toward the second end from the first end.

Variation 8 may involve a method of making the bearing system according to variation 3 and may include providing a machine with a rotor. Magnetic levitation of the rotor may be provided. The rotor may be provided with a cutting tip. The rotor may be directed through at least one of a radial, or an axial trajectory using the magnetic levitation. The profile of the bearing element on the inner circumferential surface may be cut with the cutting tip.

Variation 9 may include the method according to variation 8 and may include providing the cutting tip with a radius so that the cutting tip includes a terminal end that may contact the bearing at a cutting area.

Variation 10 may include the method according to variation 8 and may include orienting the cutting tip at an angle that is perpendicular to, or other than perpendicular to, the inner circumferential surface.

Variation 11 may include the method according to variation 8 and may include contacting the inner circumferential surface intermittently with the cutting tip while cutting the profile.

Variation 12 may involve a bearing system that may include a bearing element in the shape of a hollow cylinder with an open center. A cylindrical wall of the bearing element may define an inner circumferential surface facing the open center. A shaft may extend through the open center and may rotate about an axis and relative to the bearing element. A radial direction may be defined perpendicular to the axis. A fluid film interface may be defined between the inner circumferential surface and the shaft. A fluid may be present in the fluid film interface. The inner circumferential surface may have a profile that may be shaped with a first variation in the radial direction and with a second variation in the axial direction. A directed convergence of the fluid may be provided with one or more components in at least one of the axial direction, or the radial direction, as the shaft rotates relative to the bearing element.

Variation 13 may include the bearing system according to variation 12 wherein the inner circumferential surface may have a circumference extending completely around the axis. The profile may include a number of valleys that may define troughs along the inner circumferential surface and may define a number of peaks defining ridges along the inner circumferential surface. The troughs and ridges may alternate around the circumference of the inner circumferential surface.

Variation 14 may include the bearing system according to variation 13 wherein each of the ridges may extend in the axial direction in a curve-shaped arc, or in a linear orientation.

Variation 15 may include the bearing system according to variation 12 wherein the inner circumferential surface may vary in the axial and radial directions. Smooth ramp like structures may be formed from each valley to an adjacent peak. The circumferential and axial components of convergence may be in an uphill direction from the valley to the peak.

The above description of select variations within the scope of the invention is merely illustrative in nature and, thus, variations or variants thereof are not to be regarded as a departure from the spirit and scope of the invention.

What is claimed is:

1. A turbocharger hydrodynamic journal bearing system comprising a bearing element comprising a first surface defined by an inner diameter of the bearing element and a second surface defined by an outer diameter of the bearing element, a shaft comprising a third surface facing the first surface with a fluid film interface defined between the first and the third surfaces, wherein the shaft rotates about an axis and relative to the bearing element, wherein an axial direction is defined parallel to the axis, wherein a circumferential direction is defined around the axis, wherein the bearing element is constructed and arranged to at least one of rotate at a speed substantially less than the shaft and about the same axis as the rotating shaft or precess and not rotate about the rotating shaft, a bearing housing comprising a fourth surface defined by an inner diameter of the bearing housing, wherein the fourth surface surrounds the second surface of the bearing element, and wherein one of a hydrodynamic or a squeeze-film damper fluid film interface is defined between the second and the fourth surfaces, wherein the second surface has a continuous rigid circumferential surface, wherein the first surface has a non-circular circumferential profile extending 360 degrees around the third surface, wherein largest radial dimensions of the non-circular circumferential profile of each axial perpendicular cross-section of the first surface transitions into an axial non-cylindrical shape over an axial length of the bearing element, and wherein smallest radial dimensions of the non-circular circumferential profile of each of the axial perpendicular cross-section of the first surface comprise an axial cylindrical shape over the axial length of the bearing element.

* * * * *